J. A. CALDWELL.
Strap for Securing Hose to Coupling.

No. 197,716.                    Patented Dec. 4, 1877.

Witnesses,
W. J. Cambridge
J. E. Cambridge

Inventor,
John A. Caldwell,
Per Teschemacher & Stearns,
Attorneys.

UNITED STATES PATENT OFFICE.

JOHN A. CALDWELL, OF BOSTON, MASSACHUSETTS.

IMPROVEMENT IN STRAPS FOR SECURING HOSE TO COUPLINGS.

Specification forming part of Letters Patent No. 197,716, dated December 4, 1877; application filed November 9, 1877.

*To all whom it may concern:*

Be it known that I, JOHN A. CALDWELL, of Boston, in the county of Suffolk and State of Massachusetts, have invented an Improved Strap or Band for Securing Hose to Couplings, of which the following is a full, clear, and exact description, reference being had to the accompanying drawings, making part of this specification, in which—

Figure 1:
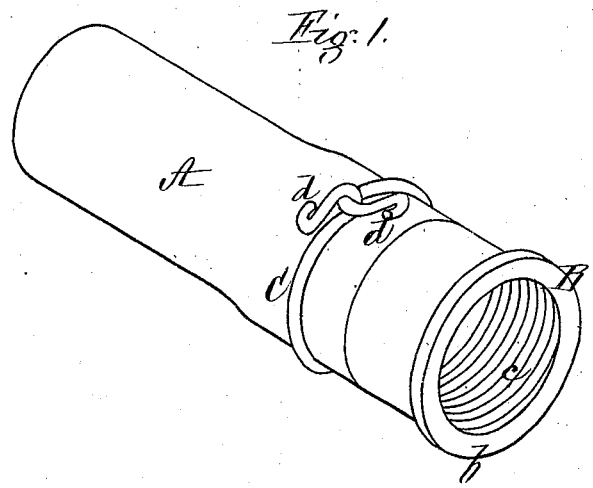
Figure 2:
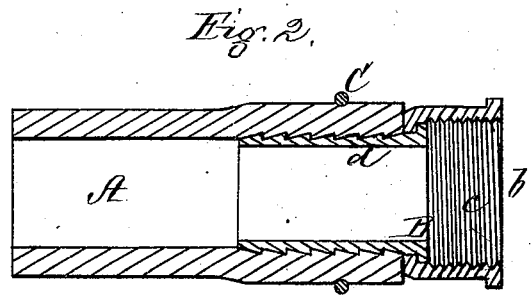
Figure 3:
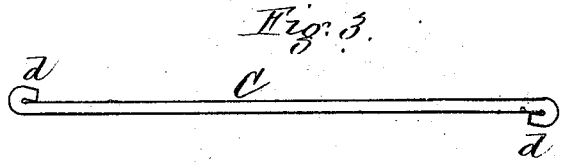

Figure 1 is a perspective view of a piece of hose secured to its coupling by my improved band. Fig. 2 is a section through the same, and Fig. 3 is a plan of my band before its application to the hose.

My invention has for its object to provide a simple, ready, and reliable means of attaching hose to their couplings; and consists in the combination, with a hose and coupling, of a metallic strap or band provided with enlarged ends, the band being bent around the outside of that portion of the hose applied to the coupling, in which position the band is tightened around the hose by a suitable implement, which draws the enlarged ends into a position in which they extend beyond or lap by each other, when the portions of the band near the enlargements are crossed or interlocked by turning the implement a portion of a revolution by a simple movement of the hand, the ends of the band being bent down to complete the operation.

To enable others skilled in the art to understand and use my invention, I will proceed to describe the manner in which I have carried it out.

In the said drawings, A represents a section of a rubber hose, one end of which is sprung over the corrugated neck $a$ of the coupling B, the swiveling head $b$ of which is provided on its interior with a screw-thread, $c$, in the usual manner.

Around the outside of the end of the hose thus applied to the corrugated neck $a$, I bend a metallic band or strap, C, the ends of which are turned over, forming enlargements $d$, as seen in Fig. 3; but the ends of this band may be enlarged by flattening or upsetting them, or by providing them with ferrules, or by other means.

I prefer to make this band of soft annealed wire, either round or flattened, and of such length that the enlarged ends (when the band is tightened around the hose by a suitable instrument) will extend beyond or overlap each other, so as to admit of their being twisted by turning the implement, so as to lock or hook them together, whereby the portion of the hose under the band is forced into the corrugations of the coupling and thus securely held together, the ends of the band being bent down on the hose, as seen in Fig. 1, immediately after the ends are hooked around each other.

As my within-described strap or band is made of soft or annealed metal, it may be readily detached from a hose and be again employed, if desired.

It is evident that two or more bands, placed side by side, may be employed, should one band be deemed insufficient.

What I claim as my invention, and desire to secure by Letters Patent, is—

The combination, with a hose and coupling, of the round or flattened wire band C, provided with enlargements $d$, the ends of the band being twisted around each other and locked together, thus securing the hose to its coupling, substantially as described.

Witness my hand this 7th day of November, A. D. 1877.

JOHN A. CALDWELL.

In presence of—
 N. W. STEARNS,
 W. J. CAMBRIDGE.